United States Patent [19]

Williams

[11] Patent Number: 4,875,393
[45] Date of Patent: Oct. 24, 1989

[54] APPARATUS FOR TENSIONING AND DEFORMING SAW BLADES

[75] Inventor: Christopher Williams, South Burnaby, Canada

[73] Assignee: Williams & White Machine Shop, Burnaby, Canada

[21] Appl. No.: 346,438

[22] Filed: May 2, 1989

[51] Int. Cl.⁴ .......................................... B23D 63/18
[52] U.S. Cl. ...................................................... 76/27
[58] Field of Search ............................. 76/25 R, 27

[56] References Cited

U.S. PATENT DOCUMENTS

| | | | |
|---|---|---|---|
| 1,053,746 | 2/1913 | Roach | 76/27 |
| 1,096,756 | 5/1914 | Roach | 76/27 |
| 2,623,414 | 12/1952 | Senard | 76/27 |
| 4,085,630 | 4/1978 | Williams | 76/27 |

FOREIGN PATENT DOCUMENTS 3313160  7/1984  Fed. Rep. of Germany .......... 76/27

Primary Examiner—Roscoe V. Parker
Attorney, Agent, or Firm—Townsend and Townsend

[57] ABSTRACT

An apparatus for tensioning the metal in the saw blade, and at the same time deform the saw blade allowing the saw to cut a narrow kerf. The apparatus dishes or deforms the saw blade to remove kinks therein, it includes a support for the saw blade which permits movement in the face plane, a fist pair of rolls mounted for rotation on a single axle with a spacer therebetween, one roll having a larger diameter than the other roll, positioned to engage one face of the saw blade, a second pair of rolls, substantially the same as the fist pair of rolls, mounted for rotation on a single axle substantially parallel to the axle for the first pair of rolls, positioned to engage on the opposite face of the saw blade divertly opposite the first pair of rolls. Provision is made to move at least one of the axles axially relative to the saw blade, and to move at least one of the pairs of rolls perpendicular to the face of the saw blade.

6 Claims, 2 Drawing Sheets

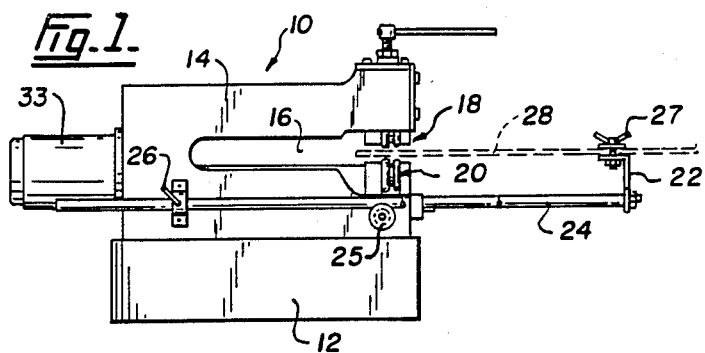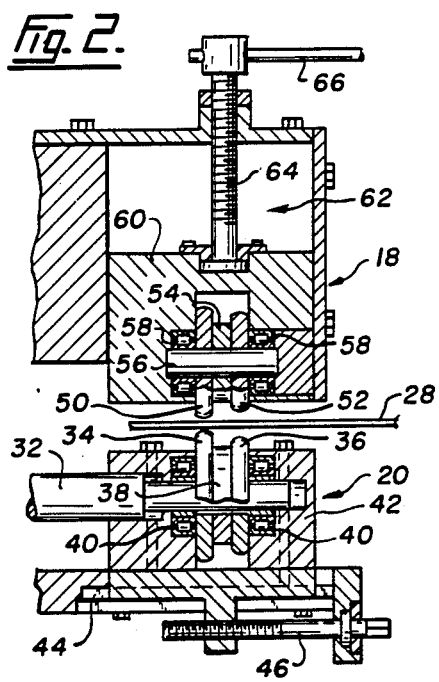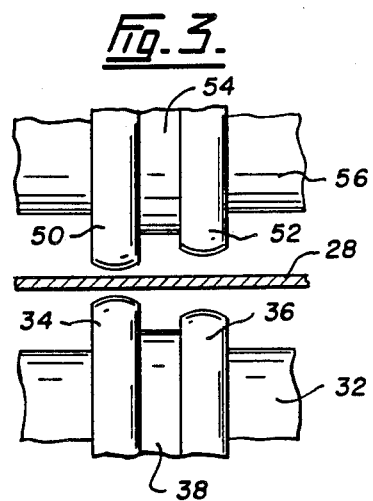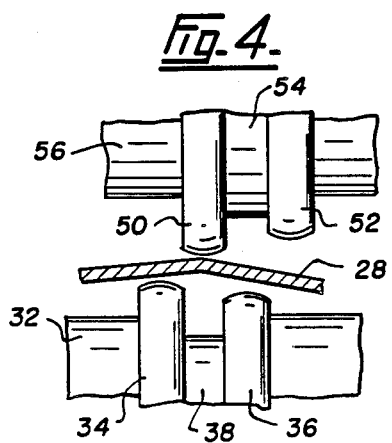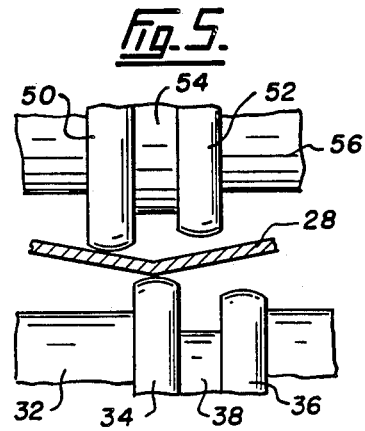

4,875,393

APPARATUS FOR TENSIONING AND DEFORMING SAW BLADES

FIELD OF THE INVENTION

The present invention relates to an apparatus for tensioning metal saw blades, such as circular saws and band saws and more specifically to a device that can tension the metal in a saw blade and at the same time deform the blade, either dishing it, removing kinks or straightening the saw blade so that the saw cuts a narrow kerf.

DESCRIPTION OF THE PRIOR ART

It is well known that saw blades must be tensioned in order to narrow the kerf cut by the saw. In some cases not only is the saw blade tensioned, but also a circular saw blade or a band saw blade is depressed at one side, referred to as dishing, so that when the saw is running at high speed it straightens and does not wobble, thus cutting a narrow kerf. This requirement is particularly true with narrow saw blades because such blades may wobble if the tension in the blade is not correct. A properly tensioned blade becomes very rigid and has no wobble therein, it also cuts a straight line with a narrow kerf and minimum sawdust produced. With regards to band saws, rigidity is attained by subjecting them to longitudinal strain during use.

One method of tensioning circular saws is by applying a pressure between two rolls adjacent the teeth of the circular saw. One such system is disclosed in my U.S. Pat. No. 4,085,630 which relates to an apparatus for adjusting the condition of metal of circular saw blades and band saw blades. In this patent, provision is made to squeeze the saw blade between two rolls and rotate a circular saw blade or move a band saw blade by rotating at least one of the rolls.

In my previous patent, an arrangement was provided which had one roll positioned on top of the blade, and two rolls with a spacer therebetween, positioned on the underside of the blade. Provision was also made to move the two bottom rolls backwards and forwards relative to the top roll, and for tensioning, it was arranged for the top roll to roll directly opposite one of the bottom rolls. In this arrangement the bottom rolls were both the same diameter.

Whereas this system works well for tensioning, it has been found that it has some limitations when it comes to dishing or deforming blades to remove kinks formed therein, particularly the necessity of having to turn the saw blade over to apply revise dishing. The present invention provides an improvement to the roller arrangement shown in my previous patent by providing a pair of top rolls and a pair of bottom rolls with one of the top rolls and one of the bottom rolls being a larger diameter than the second of the pair of rolls in both top and bottom positions. Spacers are provided between each roll of the pair, and an arrangement is made whereby the rolls may be moved axially, one with the other to position a blade therein, and to either deform it, to put a dish therein, or to remove kinks or distortions that have been formed in the blade. By providing a pair of rolls at the top and a second pair at the bottom, with one of the two rolls in both pairs being larger in diameter than the other, one is able to provide a better lever arrangement, either up or down, to distort a saw blade and thus either straighten or dish to a greater extent than was possible on the old system shown in my previous patent.

SUMMARY OF THE INVENTION

The present invention provides an apparatus for tensioning and deforming saw blades comprising support means for supporting a saw blade and permitting movement of the saw blade in the face plane of the saw blade; a first pair of rolls mounted for rotation on a single axle with a spacer therebetween, one roll having a large diameter than the other roll, and both rolls having convex peripheral surfaces, the first pair of rolls positioned to engage one face of the saw blade; a second pair of rolls, substantially the same in difference in diameter, width and spacing to the first pair of rolls, mounted for rotation on a single axle substantially parallel to the axle for the first pair of rolls, the second pair of rolls positioned to engage on the opposite face of the saw blade directly opposite the first pair of rolls; means to move at least one of the axles for the first pair of rolls and the second pair of rolls axially relative to the saw blade and to each other, and means to move at least one of the pairs of rolls perpendicular to the face of the saw blade to apply pressure to the saw blade between the first pair of rolls and the second pair of rolls.

In another embodiment the spacers are replaceable for different widths, and the rolls are different diameters to suit different thicknesses of saws. The apparatus allows saw blades to be dished and reverse dished without turning the saw blade over.

DRAWINGS OF THE INVENTION

In drawings which illustrate embodiments of the invention:

FIG. 1 is a tensioning device for a circular saw blade according to one embodiment of the present invention.

FIG. 2 is a partial vertical section through the roller arrangement shown in FIG. 1.

FIG. 3 is a partial side view showing diagrammatically the rolls arranged for tensioning a saw blade.

FIG. 4 is a partial side view showing diagrammatically the rolls arranged for dishing down a saw blade.

FIG. 5 is a partial side view showing diagrammatically the rolls arranged for dishing up a saw blade.

DESCRIPTION OF THE PREFERRED EMBODIMENTS

Figure 6:
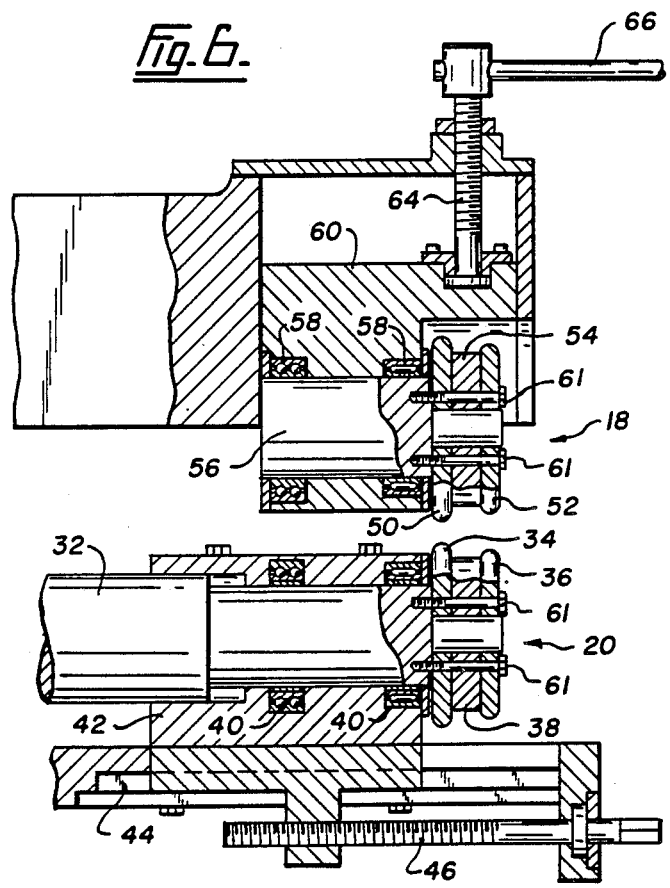
FIG. 6 is a partial vertical section through another embodiment of a roller arrangement with the rolls cantilevered.

An apparatus 10 for tensioning and deforming circular saw blades is illustrated in FIG. 1 which includes a base 12 having a frame 14 with a horizontal gap 16 therein. The frame 14 is a wishbone style and has an upper roll assembly 18 on the top of the frame and a bottom roll assembly 20 on the bottom of the frame. A saw mounting 22 is provided on the end of a horizontal arm 24 which is adjustable and may be moved out from the frame 14 on a roller 25 and locked by a locking lever 26. A wing nut 27 is shown to hold a circular saw 28 passing into the gap 16 of the frame 14. The bottom roll assembly 20 is illustrated in more detail in FIG. 2 and has an axle shaft 32 which is connected to a motor 33 shown in FIG. 1. On the axle shaft 32 are mounted a tension face roll 34, a dishing support roll 36 and a spacer 38 therebetween. The tension face roll 34 has a larger diameter than the dishing support roll 36 and both rolls have convex peripheral surfaces. The axle 32 is arranged to be in line with a radius of the circular saw blade 28, thus an extension from this axle 32 would pass through the support point 22 for the blade 28.

The axle 32 is supported on bearings 40 on each side of the rolls 34 and 36 which in turn are supported by a bearing block 42. The bearing block 42 is mounted in guides 44 with a threaded rod connection 46 that may be rotated to move the block 42, and consequently the rolls 34 and 36, axially on the axle shaft 32 which does not move. A keyway or other similar arrangement is provided so that the axle shaft 32 can rotate the rolls 34 and 36 regardless of the location of the rolls on the axle shaft 32.

The upper roll assembly 17 comprises an upper tension face roll 50, an upper dishing support roll 52 with a spacer 54 therebetween. The shape of the tension face roll 50 and the dishing support roll 52 is substantially the same as the shape of the lower rolls 34 and 36. The key importance being the difference in diameter between the dishing support roll 52 and the tension face roll 50 remain the same for both the upper roll assembler 18 and the lower roll assembly 20. The upper tension face roll 50 and upper dishing support roll 52 are located on a shaft 56 which rotates freely within two bearings 58 on each side of the rolls 50 and 52. The bearings are mounted in an upper block 60 in a trunnion arrangement 62 which moves vertically up and down by a screw thread 64 and handle 66. The upper axle shaft 56 is parallel to the lower axle shaft 32 and in line so that when the top roll arrangement is lowered with the pairs of rolls in line, the two tension face rolls 34 and 50 contact each other.

The tension face rolls 34 and 50 are on the teeth side of the blade 28 as shown in FIG. 1. Both the upper roll assembly 18 and the lower roll assembly 20 have rolls the same diameter, width and the spacers 38 and 54 between the rolls are the same thickness. The spacers may be changed to different thicknesses, however the thickness for both the top roll assembly 18 and bottom roll assembly 20 must remain the same. When the spacer thickness is reduced, a spacer having the difference in thickness is used on either the inside or the outside of the roll assembly.

FIG. 3 illustrates one use of the tensioning device wherein the upper tension face roll 50 is directly in line with the lower tension face roll 34. The saw blade 28 is positioned therebetween and the handle 66 is rotated to lower the upper block 60 and apply a tension to the saw blade 28 pinched between the two rolls 50 and 34. The lower roll assembly 20 is rotated by the motor 33, thus as the roll 34 rotates it moves the saw blade about its centre to tension the saw blade surface. By adjusting the arm 24 different surface areas of the saw blade are tensioned so that the whole saw blade itself may be tensioned.

FIG. 4 illustrates a saw blade 28 being dished down. The lower roller assembly 20 is moved axially so that the upper tension face roll 50 is positioned just about opposite the spacer 38 for the lower roll assembly 20. The upper tension face roll 50 pushes the saw blade down so that it rests on the lower tension face roll 34 and the lower dishing support roll 36, thus having a positive downward movement but limited by the difference in diameter between the tension face roll 34 and the dishing support roll 36. FIG. 5 illustrates another embodiment where a saw blade is dished up. In this arrangement the lower tension face roll 34 is positioned substantially opposite the upper spacer 54 and the dishing of the blade occurs upwards from the force supplied by the lower tension face roll 34 pressed between the two upper rolls 50 and 52. The upper dishing support roll 52 prevents the angle that the saw blade 28 can be dished or bent, thus a controlled dishing up or dishing down can be accomplished with both the upper roll arrangement 18 and lower roll arrangement 20 of the present application.

FIG. 6 discloses an apparatus suitable for band saw blades wherein the axle shaft 32 in the bottom roll assembly 20 extends beyond the bearings 40 to support the tension face roll 34 and dishing support roll 36 in a cantilevered configuration. The axle shaft 56 in the top roll assembly 18, also extends beyond the bearings 58 to support the tension face roll 50 and the dishing support roll 52 in a cantilevered configuration. Bolts 61 in both the top assembly 18 and the bottom assembly 20 hold the rolls and spacers on the shafts. Different widths of spacers 54 and 38 may be used between the rolls to take into account different thicknesses of saw blades and different diameters of rolls may also be provided for different blades. The cantilevered configuration of rolls permits band saw blades to be located at any position on the saw blade. Band saws are heavy and by utilizing the cantilevered configuration one can move the apparatus backwards and forwards to cover the width of the saw blade, and also press up or down by arrangement of the rolls.

Saw blades vary in thickness from about 1/16 of an inch to ⅛ of an inch and the spacers 38 and 54 are usually about ½ of an inch but may be more or less to suit a particular saw blade. Band saw blades may be dished, but tensioning usually occurs between the band saw pullies.

Various changes may be made to the embodiment shown herein without departing from the scope of the present invention which is limited only by the following claims.

The embodiments of the present invention in which an exclusive property or privilege is claimed are defined as follows:

1. Apparatus for tensioning and deforming saw blades comprising:

Support means for supporting a saw blade and permitting movement of the saw blade in the face plane of the saw blade;

a first pair of rolls mounted for rotation on a single axle with a spacer therebetween, one roll having a larger diameter than the other roll, and both rolls having convex peripheral surfaces, the first pair of rolls positioned to engage one face of the saw blade;

a second pair of rolls, substantially the same in difference in diameter, width and spacing the first pair of rolls mounted for rotation on a single axle substantially parallel to the axle for the first pair of rolls, the second pair of rolls positioned to engage on the opposite face of the saw blade directly opposite the first pair of rolls;

means to move at least one of the axles for the first pair of rolls and the second pair of rolls axially relative to the saw blade and to each other, and means to move at least one of the pairs of rolls perpendicular to the face of the saw blade to apply pressure to the saw blade between the first pair of rolls and the second pair of rolls.

2. The apparatus according to claim 1 including power means to rotate one of the pairs of rolls.

3. The apparatus according to claim 1 wherein the spacers for the first pair of rolls and the second pair of rolls are replaceable for spacers of different widths, while maintaining spacers of the same width for both pairs of rolls.

4. The apparatus according to claim 1 wherein the roll having the larger diameter in both of the pairs of rolls is located on the teeth side of the saw blade.

5. The apparatus according to claim 4 wherein the apparatus is for tensioning and deforming circular saw blades, and the axles for the pairs of rolls are positioned parallel to the radius of the circular saw on a central mount having axial location means.

6. The apparatus according to claim 1 wherein the first pair of rolls and the second pair of rolls have a cantilever configuration.

* * * * *